May 18, 1965    W. C. BROEKHUYSEN    3,184,571
THERMOSTAT HAVING MOTION AMPLIFICATION AND SHOCK RESISTANCE
Filed Jan. 22, 1962
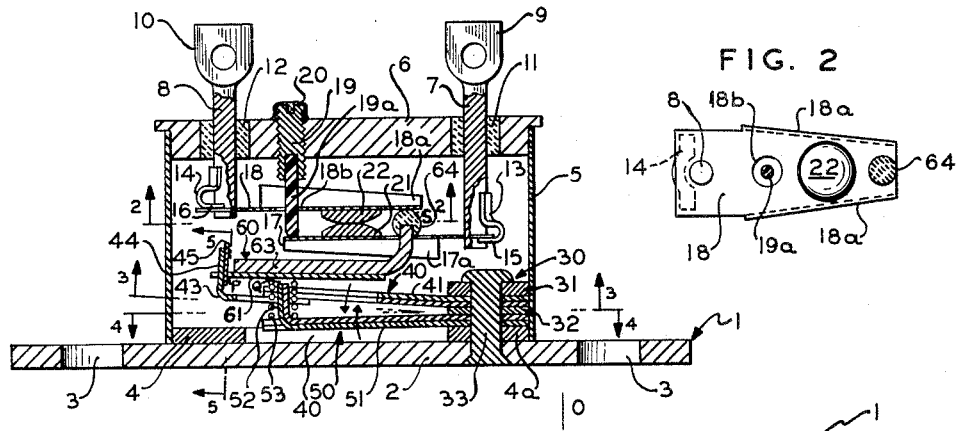
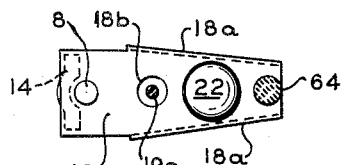
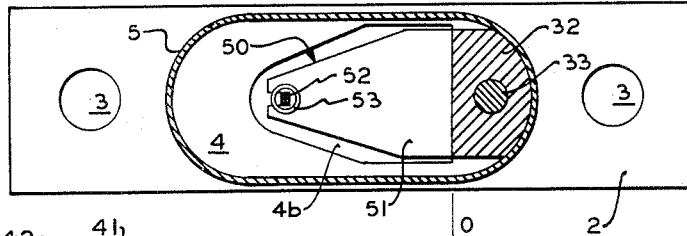
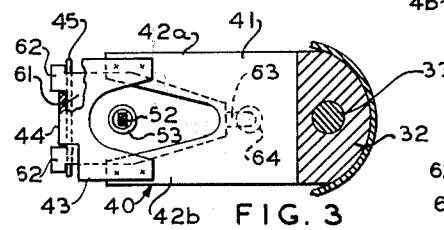
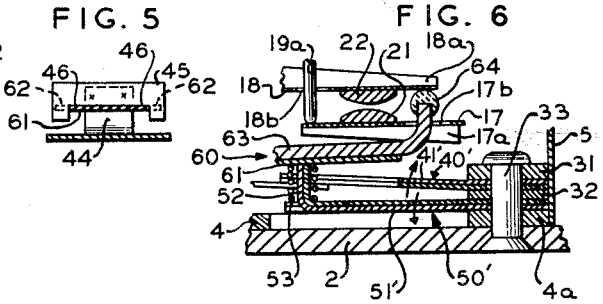
INVENTOR.
WILLIAM C. BROEKHUYSEN
BY
ATTORNEY United States Patent Office 3,184,571
Patented May 18, 1965

3,184,571
THERMOSTAT HAVING MOTION AMPLIFICATION AND SHOCK RESISTANCE
William C. Broekhuysen, New York, N.Y., assignor to G-V Controls Inc., Livingston, N.J., a corporation of New Jersey
Filed Jan. 22, 1962, Ser. No. 167,570
13 Claims. (Cl. 200—138)

This invention relates to a thermostat, and more particularly to that class of thermostat whose function is to open or close a pair of electrical contacts at a particular, or operating, temperature.

It is an object of the invention to provide a thermostat of the abovementioned class which is of small physical size yet in which the movement of the contacts relative to each other is characterized by relatively high energy, or by a relatively high product of motion by force. It is an object to provide such a thermostat which employs, for the generation of contact movement, bimetallic-element means of limited length and width but in which the relative movement of the contacts is characterized by relatively high energy. It is an object to provide such a thermostat of limited size characterized by more energy of motion of one contact relative to a stationary contact than can be obtained from a single bimetallic element within the same limited size.

It is an object of the invention to provide a thermostat of the abovementioned class which will operate satisfactorily in an environment which imposes thereon substantial vibration at one or more frequencies, for example frequencies as high as 2,000 cycles per second. It is an object to provide such a thermostat the parts of which have a relatively high lowest-mode resonant frequency, for example over 2,000 cycles per second.

It is an object to provide a thermostat of the abovementioned class which will operate satisfactorily even while being subjected to heavy shock.

It is an object to provide a thermostat of the abovementioned class which responds very rapidly to changes in the influencing temperature. It is an object to provide such a thermostat which responds very rapidly to changes in temperature of a surface on which it is mounted, and one which so responds even in an ambient temperature substantially different from the temperature of that surface.

It is an object to provide a thermostat of the abovementioned class by which heavy currents may be controlled with negligible influence by those currents on the operating temperature of the thermostat.

Objects are to achieve simultaneously objectives stated in more than one of the preceding paragraphs, and to achieve simultaneously the objectives stated in all.

It is an object to achieve the foregoing objectives while avoiding, over a wide range of influencing temperatures, the imposition on either the means which generates the contact movement or on other portions of the thermostat of substantial stresses which would tend to result in drift of the operating temperature from the value to which it has been deliberately adjusted.

A special object is to provide a thermostat of the abovementioned class which is essentially insensitive to slow changes of temperature but does respond to a rapid change.

Another special object is to provide a thermostat of the abovementioned class which operates at one influencing temperature when the influencing temperature changes slowly and at another when the influencing temperature changes rapidly.

Other and allied objects will appear from the following specification and the appended claims.

In one principal aspect the invention comprises a thermostat in which there are employed two cantilever members each comprising a bimetallic element which curves in response to temperature change and has one end rigidly secured to the frame of the thermostat, the members having respective portions moved along generally parallel paths by the bimetallic elements in response to such change, and the line between those portions being at a substantial angle to each of those paths. A lever is pivoted at one of its ends to the movable portion of one of the members, and at a region intermediate its ends is pivotally supported on that portion of the other member. The output contacts of the thermostat are moved relatively to each other by the other end of the lever. Desirably, the frame is thermally conductive, with both or one of the elements (depending on the purposes of the thermostat) closely coupled thermally to it. In important embodiments the displacements of the abovementioned lever-affecting portions of the members in response to a given temperature change are opposite to each other, thereby rendering the relative movement of the contacts substantially responsive to the sum of the movements of those portions.

In a preferred construction according to the invention the secured ends of the members are close to each other, the members and the motion-receiving portion of the lever extend substantially parallel with each other with the first member intervening between the second and the lever, and the second member includes transversely projecting means in which its lever-supporting portion is located.

According to one aspect of the invention at least one and preferably both of the elements, throughout at least a substantial part of its length, has an effective transverse dimension, normal to the path of its lever-affecting portion, which progressively reduces with increasing distance from its secured end. With respect to one of the elements this is desirably achieved by forking its unsecured end, the first end of the lever being associated with the branches of the fork. Conveniently the other member includes transversely projecting means passing between those branches and on which the lever-supporting portion of that other member is located.

In other aspects the invention contemplates the frame being the principal avenue for the flow of heat to and from the bimetallic elements. In one of such aspects it contemplates a deliberate differentiation between the degrees of thermal coupling of the respective elements to the frame and, in a particular embodiment wherein such differentiation is effected, a similarity of the directions in which the lever-affecting portions of the members are moved in response to temperature change. In another of those aspects the invention contemplates, in addition to the differentiation just mentioned, also a differentiation between the curvature of the bimetallic element comprised in one of the members per degree temperature change of that member from the corresponding curvature of the other bimetallic element.

The invention further contemplates the subject matters of the preceding paragraph in the broader background of a thermostat having a part (corresponding to the frame) substantially exposed to a temperature to be sensed, two members each displacingly responsive to temperature change but substantially free of direct exposure to the temperature to be sensed, and a pair of contacts coupled to the members for relative movement by each.

In the detailed description of the invention hereinafter set forth reference is had to the accompanying drawing, in which:

FIGURE 1 is a vertical cross-sectional view (except for small fractional portions shown in elevation) of a thermostat in which the invention has been embodied in one form;

FIGURE 2 is a cross-sectional view taken along line 2—2 of FIGURE 1, as seen looking upwardly;

FIGURE 3 is a cross-sectional view taken along the line 3—3 of FIGURE 1, as seen looking upwardly;

FIGURE 4 is a cross-sectional view taken along line 4—4 of FIGURE 1, as seen looking downwardly;

FIGURE 5 is a substantially vertical cross-sectional view taken along line 5—5 of FIGURE 1;

FIGURE 6 is a fractional vertical cross-sectional view (intended for optional substitution for the corresponding portion of FIGURE 1) illustrating a thermostat in which the normal condition of the contacts has been reversed from that of FIGURE 1;

FIGURE 7 is a fractional vertical cross-sectional view (intended for optional substitution) illustrating a modified form of thermostat according to the invention;

FIGURE 8 is a fractional vertical cross-sectional view (intended for optional substitution) illustrating a further modified form; and FIGURE 9 is a fractional vertical cross-sectional view (intended for optional substitution) illustrating a modification of the bimetallic elements which may be employed with any of the previously illustrated forms of thermostat.

Reference being had to FIGURES 1 and 4, there will be seen in somewhat enlarged scale a frame, designated generally as 1, which for the purposes of this specification may be considered as formed by the rectangular lower plate 2 provided with mounting holes 3, a straight-sided-oval upper plate 4 brazed to the central portion of the lower plate, a straight-side-oval wall 5 whose bottom margin fits around and is soft-soldered to the periphery of the upper plate 4, a straight-sided-oval cover or header 6 set into and soft-soldered to the upper mouth of the wall 5, and two pins 7 and 8 passing through the header 6 near its respective ends but insulated from the header by respective glass beads 11 and 12 each of which intervenes between and is fused to both its respective pin and the header. All parts of the frame 1, with the exception of the glass beads, are of metal of good thermal conductivity such as brass or the copper-nickel alloy known as nickel silver. The pins 7 and 8 may be formed at their tops into respective soldering lugs 9 and 10.

It will be recognized that the frame as thus described forms a complete enclosure, within which are contained all the thermostat parts hereinafter described. A frame of this nature is preferred in order that the response of the thermostat may be made as uniquely as possible a response to the temperature of a surface against which the frame (preferably its lower plate 2) may be secured, and as little as possible to some ambient of different temperature in which that surface and the thermostat may be located; unexpressed limitations in this respect, however, are not intended.

The righthand (as seen in FIGURE 1) pin 7 may extend downwardly from the header about half-way toward the lower plate 2; at an intermediate level in this downward extent there may be spot-welded to its righthand surface a suitable bracket 13 which from the welding may curve rightwardly, downwardly and finally leftwardly to terminate in a horizontal ledge 15. The lefthand pin 8 may extend downwardly from the header for a somewhat shorter distance; just below the header there may be spot-welded to this lefthand surface a suitable bracket 14 which from the welding may curve leftwardly, downwardly and finally rightwardly to terminate in a horizontal ledge 16 somewhat higher in elevation than the right ledge 15. Through the header a little to the right of the lefthand pin 8 a screw 19 may be threaded downwardly; an axial pin 19a of insulating material inset with cement into the body of this screw forms the lower portion of the screw, which may extend down to an elevation of the order of that of the righthand ledge 15.

A thin spring arm 17 (whose thickness is somewhat exaggerated in the drawing) may in its righthand portion be spot-welded on top of the righthand ledge 15 and may extend therefrom leftwardly to a little beyond the bottom of the screw 19. All but the portion of this arm at and near the ledge 15 may be channeled into U-shaped cross-section as a reinforcement against flexure, as indicated by the folded marginal portion 17a; the unchanneled portion will remain capable of flexure, and at and near the ledge may be stressed so that the arm 17 is dependably biased upwardly against the bottom of the screw 19. At approximately the side-to-side center of the thermostat there is spot-welded to the top of the arm 17 the contact 21.

A similar thin spring arm 18 may in its lefthand end portion be spot-welded on the bottom of the lefthand ledge 16 and may extend therefrom rightwardly toward but not fully to the pin 7, this arm being provided with a hole 18b clearing the lower portion of the screw 19. All but the portion of this arm at and near the ledge 16 may be channeled into U-shaped cross-section as a reinforcement against flexure, as indicated by the folded marginal portion 18a; the unchanneled portion will remain capable of flexure, and at and near the ledge may be stressed so that the arm 18 is biased downwardly. To the bottom of the arm 18, above the contact 21, there is spot-welded a contact 22, which by reason of the bias of the arm 18 will tend to occupy a position wherein it touches and presses against contact 21 from the top. FIGURE 2 illustrates the arm 18 from the bottom; it shows a desirable tapering or reducing of the width of the arm with increasing distance from the unchanneled portion, which tapering desirably characterizes the width of arm 17 as well.

The arms 17 and 18 and contacts 21 and 22, to which electrical connections will be made through the lugs 9 and 10, constitute the output circuit of the thermostat. It is the function of the portions of the thermostat hereinafter described to effect appropriate relative movements of those contacts. More specifically in the illustrated structure, wherein the contact 21 is fixed in position relative to the base by the manual adjustment of the screw 19, it is the function of the hereinafter-described portions to effect appropriate movements of the contact 22.

In the illustrated thermostat those portions are in general located below the contacts 21 and 22 and their arms 17 and 18. Basically they comprise two cantilever members 40 and 50, typically generally parallel and one above the other, comprising respective bimetallic elements 41 and 51 each having an end portion secured to the frame, typically at the common stack 30, the members extending typically leftwardly from that stack and having respective portions remote therefrom which are moved along generally parallel and typically vertical paths by the respective bimetallic elements in response to temperature change, and the line between those movable portions being one which forms a substantial angle with each of those paths, typically a horizontal one generally parallel with the members. They further comprise a lever 60, typically above the upper member, having a first end pivoted to the movable portion of one of the members and having a longitudinally intermediate region pivotally supported on the movable portion of the other member, the second end of the lever extending into contact with the arm 18 and being the element which immediately effects movements of that arm and of the contact 22 thereby carried.

In FIGURE 1 the common stack 30 includes the righthand end portion 4a (i.e., that to the right of line 0—0 in FIGURE 4) of the upper plate 4, which plate to the left of that line is provided with an aperture 4b only slightly less wide than the plate. Above the plate portion 4a there is assembled the righthand end portion of the lower bimetallic element 51, which may be slightly narrower than the aperture 4b in order that its leftward portions may deflect to within the aperture and the end of which may be curved to abut, like the plate, against the wall 5. Above the bimetallic element 51 the stack 30 includes the spacer 32 of width corresponding to that of the element 51, having a left end aligned above the line 0—0 and having a righthand end curved to abut against the wall 5.

Above the spacer 32 there is assembled the righthand end portion of the upper bimetallic element 41, which may be of width similar to those of the lower element 51 and of the spacer 32, and the end of which may be curved to abut against the wall 5. Above the bimetallic element 41 the stack includes the small plate 31 of configuration identical to that of, and aligned above, the washer 32. The stack finally includes a strong thermally conductive rivet 33 passing vertically through the several parts of the stack and through the lower plate 2, all of which are appropriately apertured for the purpose, and serving to clamp the same tightly together. The plate 31, washer 32 and rivet 33 are all of metal of good thermal conductivity such as brass or nickel silver.

The bimetallic elements are of course thermally coupled in considerable degree to the stack by their clamping therein, and through the stack to the upper plate 4 and thus to the frame; it is, however, desirable that the degree of their coupling to the frame be even further increased. For this purpose the entire righthand curved surface of the stack and of the bimetallic elements therein clamped may be soft-soldered to the wall 5. An appropriate procedure which accommodates this is the assembly of the lower and upper plates 2 and 4, stack 30 and bimetallic elements 41 and 51 followed by the tinning of that curved surface; the edge of the upper plate 4 and the inner surface of the wall 5 will previously have been tinned, and it is therefore only necessary to slip the wall 5 into place and to heat it externally in order to solder it both to that curved surface and to the plate edge.

Attention may now be directed to the bimetallic elements 41 and 51, the design of which directly affects among other things the motional energy at the contacts 21 and 22, or at the contact 22 when (as in the illustrated structure) contact 21 is fixed. In determining such energy two parameters are of fundamental importance. One of them is the contact deflection $d$ which is effected per degree temperature change when the contacts are completely free of restraint, and the other is the force $f$ which is produced at the contacts per degree temperature change when the contacts are completely restrained. The energy at the contacts, which it is desirable to maximize, is in general directly proportional to the product $df$. By step-up or step-down of the motion or motions of the bimetallic element or elements, as by a lever interposed between it or them and the contacts, $d$ may be increased at the cost of reducing $f$ and vice versa—but with no change of the product, which is uniquely established in the bimetallic element or elements.

It may be shown that for any bimetallic element the product $df$ is equal to the active or deflectible volume of the element multiplied by a constant, that constant depending on the materials from which the element is made, on its basic arrangement (that is, whether it is of cantilever, helix, spiral or other arrangement) and, for any basic arrangement such as the cantilever arrangement used in the present thermostat, on its configuration in such respects as uniformity or non-uniformity of its cross section throughout its active portion. In a thermostat required to occupy a restricted space the length and maximum width are limited, and it is necessary to view the thickness (which affects volume) and the configuration (which affects the constant mentioned above) as the remaining manipulable parameters.

As to thickness, it is true that the effect of its increase is a proportionate increase of the product $df$—but with an attendant proportionate decrease of deflection $d$ (the force $f$ meanwhile executing a squared increase). There are limits, imposed by the necessity for significant contact motion, to the reduction of $d$ in its own right, even though motion step-up be resorted to (since motion step-ups of more than a few times are in general impractical in their own right in the face of externally imposed vibratory forces such as those which the present thermostat is intended to withstand); thus there are limits to the increase of thickness, and when these are approached configuration becomes the one remaining manipulable parameter. Finally, in a thermostat which is required to withstand externally imposed vibratory forces of as high as possible a frequency, the configuration should be manipulated in a manner which appropriately favors that withstanding as well as high energy at the contacts.

I have found that an element whose active portion is of given length and thickness and of given width at its base (i.e., immediately adjacent to its inactive or clamped portion) but which is triangular, with its width tapering uniformly from its base to a point at the remote end, is characterized by a value of $d$ identical to, and with a value of $f$ two-thirds of, the corresponding values characterizing an element of similar length and thickness but of uniform width equal to the base width of the first. In other words, the first has a $df$ product two-thirds that of the second, achieved with no sacrifice of $d$. At the same time I have found that the first is characterized by a fundamental or lowest-mode resonant frequency of over twice that of the second. The net result, for use in a thermostat best operable in the postulated vibratory environment, is a marked superiority of the first or triangular element over the second or rectangular one.

The superiority of the triangular cantilever element tapering away from its base, discussed above, has to do with energy or the $df$ product available at the contacts operated by that element—$d$ being important for such reasons as minimization of the effects of contact erosion on the setting of the thermostat, rapid building-up of breakdown potential between the contacts as they open, etc., and $f$ being important for such reasons as minimization of contact sticking, improvement of vibration resistance and the like—and with maximization of resonant frequency. Such a triangular element is, however, superior for still other reasons as well. One of these reasons is speed of response, which is increased in such an element both by reason of the reduction of thermal capacity and by reason of increase, along any cross section, of the ratio of the conductivity through that section to the thermal capacity beyond (i.e., more remote from the base than) that section.

Another of these additional reasons, of particular significance in the case of a cantilever bimetallic element whose width is substantial compared to its length, has to do with transverse curvature. Such curvature of course tends to occur as well as does the lengthwise curvature which results in the intended deflection, and can become very appreciable when the element is relatively wide; it stiffens the element along its length, thus interfering with the lengthwise curvature and consequently reducing the intended deflection. In a triangular cantilever element tapering away from its base the degree of the transverse curvature is greatly reduced and its effect on the intended deflection largely eliminated.

Because of structural requirements for some finite width at the remote end of each of the bimetallic elements, it is not practical to carry the tapering to the limiting case of termination in a point (i.e., complete triangular shape). Further, it is not of great significance whether the tapering starts immediately at the stack or at a point removed therefrom by some minor fraction of the length of the active portion. Still further, the tapering need be only of the effective width, i.e., it may be accomplished by removing from an otherwise rectangular shape either two triangles respectively containing the remote corners, or a single transversely central triangle or approximate triangle so that the resulting element is a forked one.

Such departures from the theoretically preferred triangular shape of the active portion discussed in the preceding three paragraphs do not seriously detract from the advantages therein set forth.

For the upper bimetallic element (for convenience hereinafter referred to as the first of the two bimetallic elements) I employ the tapering by forking just referred to. Thus the active or unclamped portion of this element (seen in bottom plan in FIGURE 3) may extend from the stack 30 leftwardly, for example almost to a point vertically aligned beneath the righthand surface of the lefthand pin 8, in the same outer width as that of its clamped righthand end portion; from it, however, there is removed a central approximate triangle extending from its remote end to terminate in a rounded apex only about one-third of the way from the stack to that end, causing the lefthand portion of the element to be in the form of a fork whose prongs are respectively designated 42a and 42b.

For the lower bimetallic element 51 (hereinafter referred to as the second) I employ the tapering of the outer width. Thus the active or unclamped portion of this element (seen in top plan in FIGURE 4) may extend from the stack 30 leftwardly for only about one-fourth of its total length in the same outer width as that of the clamped righthand end portion and may therebeyond extend in progressively decreasing width to terminate (for example vertically beneath the lefthand end of the first bimetallic element 41) in a width only about one-third as great.

The first bimetallic element 41 forms the principal component of the first cantilever member 40. The remaining portions of that member may comprise a short flat forked member 43 (see especially FIGURE 3), whose prongs are oppositely directed to, and are spot-welded to the bottoms of the end portions of, the prongs 42a and 42b of element 41; a lug 44 (see FIGURES 1, 3 and 5) extending from the lefthand end of the member 42, first a short distance leftwardly and then a greater distance upwardly; and a low but wide inverted U-shaped plate 45 (see especially FIGURE 5) spot-welded to the righthand surface of the upright portion of the lug 44—the internal width between the legs of the plate 45 being made sufficiently greater than the width of the lug 44 so as to form slots 46 on each side of that lug. These remaining portions serve to make the leftward extent of the member 40 greater than that of the element 41 itself, and to provide for the pivoting to that member of the end of the lever 60 in manner hereinafter described.

The second bimetallic element 51 forms the principal component of the second cantilever member 50, the remaining portions of which may comprise means projecting upwardly from the element 51 between the prongs 42a and 42b of the element 41 and between the prongs of the forked member 43. Those means may comprise a lug or post 52, which may conveniently but not necessarily be formed by folding upwardly a central part of the lefthand end portion of the element 51 (that central part being then initially made of extra length for the purpose), and a coil spring 53 surrounding the post 52, terminally resting on top of the element 51 and, in the absence of compression, extending to substantially above the top of that post. Such projecting means serve to provide for the pivotal support on the member 50 of an intermediate region of the lever 60 in manner hereinafter described.

The lever 60 (seen in cross section in FIGURE 1 and in partially dotted bottom plan in FIGURE 3, with lefthand end portion to be seen sectionally in FIGURE 5) comprises a generally horizontal flat plate 61 extending rightwardly from the lug 44, and a generally L-shaped rod or wire 63 of which the longer leg is spot-welded along the central line of the top of plate 61. The shorter leg of the L-shaped rod 63 extends upwardly almost to the righthand end portion of the arm 18 (which carries contact 22); at its upper end it is surrounded by a glass bead 64 fused to it, to pass which bead freely the arm 17 is suitably apertured.

The plate 61 in its lefthand portion may have a width minutely less than the spacing between the downhanging legs of the U-shaped plate 45; from that portion rightwardly the width of the plate 61 is desirably tapered toward a narrow termination slightly to the left of the short upright leg of rod 63. The lefthand end of the plate 61 (see FIGURE 3) abuts or substantially abuts against the righthand surface of the lug 44; this condition may be enforced by a pair of small L-shaped lugs 62 forming leftward extensions from the plate 61, the inner leg of each lug passing through a respective one of the slots 46 mentioned above and the outer leg of each lug extending closely along the lefthand surface of a respective one of the legs of plate 45. The lefthand top margin of the main portion of plate 61 is biased upwardly, as hereinafter explained, against that bottom edge of the plate 45 which intervenes between its legs. This construction results in a pivoting of the lefthand end of the lever 60 at a portion of the first member 40—i.e., the lug 44 and plate 45—remote from the secured end of that member.

From its pivoted lefthand end the lever 60 extends rightwardly, generally parallel with the members 40 and 50, passing above the tops of the post 52 and spring 53 and for a substantial distance therebeyond. In its region above that post and spring the lever is borne up against by the top of that post or of that spring, depending on whether the contact 22 is spaced from or is touching the contact 21. This arrangement, which provides a pivotal support of an intermediate region of the lever on a portion of the second member—i.e., the top of the projecting means 52–53—remote from the secured end of that member, also results in biasing of the lefthand top margin of the plate 61 up against the bottom edge of plate 45 between the legs of the latter, and in a biasing of the bead 64 up against the bottom of the arm 18.

In the particular construction thus described both the members 40 and 50 and the part of the lever 60 between its pivoted end and its pivotally supported intermediate region extend generally parallel with each other, with the first member intervening between the second member and the lever. This arrangement has among others the advantage that the separation between the lever and that member (the first) to which its end is pivoted may be kept relatively small and the longitudinal movement of the pivoting point or line with curvature of that member therefore relatively small, while the more substantial separation between the lever and the other member (the second) entails no disadvantages.

The thermostat specifically illustrated in FIGURE 1 is arranged simply to have its output contacts 21 and 22 closed at temperatures below an operating temperature and open at temperatures thereabove; it employs bimetallic elements which may be of materials and thicknesses similar to each other. Those elements are arranged so that the directions in which the abovementioned portions of the members are displaced in response to temperature change are opposite to each other—more specifically, so that with temperature increase that portion of the first member 40 is displaced downwardly and that portion of the second member 50 upwardly, as indicated by the arrows in FIGURE 1, the low-expansion layers of the bimetallic elements accordingly being the bottom layer of the upper element 41 and the upper layer of the lower element 51.

FIGURE 1 may be considered as illustrating its thermostat at an ordinary temperature (for example, of the order of 68° F.), under which conditions the active or unclamped portions (as well of course as the clamped portions) of the bimetallic elements may for example each be flat. It is, however, desirable that one or both be slightly bent along the line of emergence from the stack 30 so that they diverge somewhat from each other going away from the stack, in order to render high the temperature at which remote portions of the two will come into contact with each other and thus to guard against overstressing of either at high temperatures; FIGURE 1 accordingly illustrates the upper one as bent slightly upwardly and the lower one as bent very slightly downwardly.

FIGURE 1 illustrates at an ordinary temperature a thermostat adjusted for an operating temperature appreciably thereabove, and therefore depicts the thermostat in a sub-operating-temperature condition. The arm 17 is of course biased upwardly against screw 19 with a sufficient force so that the contact 21 resists any downward movement by the downwardly biased arm 18 and its contact 22. In turn the arm 18 is biased downwardly with a force which, though less than the upward biasing force of arm 17, is nevertheless sufficient so that the arm 18 resists any upward movement by the lever 60 under the influence of the considerably compressed spring 53. In turn the compressed spring 53 exerts on the lever 60 an upward force which, though insufficient to move arm 18 upwardly, is nevertheless sufficient to maintain the lefthand end of that lever seated in its proper pivotal relationship to the upper member 40 and the bead 64 in contact with the arm 18. The top of the post 52 will be spaced below the lever 60 to a degree dependent on the deficiency of the actual temperature below the operating temperature.

When the temperature increases its rise is rapidly communicated through the frame 1 and stack 30 to the bimetallic elements 41 and 51, and in response to their temperature rise the upper element 41 will deflect downwardly and the lower element 51 upwardly. The attendant downward movement of the lefthand end of the lever 60 results in a counterclockwise rocking of the lever about its pivoted lefthand end, since the contact of its righthand end (bead 64) with the arm 18 is being maintained under the influence of the spring 53, along with which there will occur a progressive change of the angle between the lever and the axis of the post 52 and spring 53 as well as an increase of the compression of that spring. When the elements 41 and 51 have reached the operating temperature the gap between the top of the post 52 and the lever 60 will just have been closed. During this process the rate of rocking of the lever is relatively slow, since its motion-receiving arm is its whole length.

As the elements 41 and 51 proceed to attain an infinitesimally higher temperature the continued rocking of the lever caused by the continued lowering of the lever's lefthand end is abruptly increased in rate (for example, almost quadrupled), since its motion-receiving arm has now become only the distance between its lefthand end and the top of post 52; furthermore there is forthwith added a further and even slightly greater component of lever rocking caused by the continued raising of the top of post 52. The effect of the lever rocking occurring, at the very greatly augmented rate, after the elements 41 and 51 have reached the operating temperature is rapidly to raise the bead 64 from its illustrated position and the contact 22 from the contact 21, and thus abruptly to open the output circuit of the thermostat.

If the lefthand end of the lever be denominated as P, the top of the post 52 as Q, and the top of the bead 64 as S, then the upward motion at S will be the downward motion at P multiplied by the step-up ratio $QS/PQ$, plus the upward motion at Q multiplied by the step-up ratio $PS/PQ$. Accurately to express the motion at the contact 22 these ratios must be proportionately reduced, but in minor degree only.

In general terms and without regard to the precise values of the step-up ratios, the contact motion in the thermostat of FIGURE 1, with its member portions arranged for displacement in opposite directions, may be said to be responsive to the sum of the movements of P and Q. If instead of the two members 40 and 50 with their respective bimetallic elements there were used a single member comprising one bimetallic element obeying the same length and width limitations, then for the same contact energy that element would have to be twice as thick as either 41 or 51; its deflection per degree temperature change would be only half that of either 41 or 51, or one-quarter of their sum; and for the same contact motion there would have to be used a lever with the wholly impractical step-up ratio of four times the average or mean of the ratios $PS/PQ$ and $QS/PQ$, which latter are themselves about as high as can be satisfactorily used in a vibratory environment. Furthermore the pivoting point or line for that lever would have to be on the frame, at a point relatively remote from the secured end of the single bimetallic element, and any unintended displacement of the remote end of the bimetallic element relative to that pivoting point or line, caused by distortion of the frame, relief of stress in the element or the like, would at the contacts be multiplied by the same extremely high step-up ratio.

Among other things because of the separation between the effective pivoting points or lines of arm 18 and lever 60 there occurs during the movement of the contact 22 a slight frictional slipping of the bead 64 along that arm; among other things because of the progressive slight shift of the separation between the point or line of pivoting of the lever 60 and the top of post 52 there occurs during the contact movement a slight frictional slipping of the top of that post along the bottom of that lever. The energy dissipation involved in these frictional slippings helps to reduce sensitivity to externally imposed vibration and shock. Furthermore both minutely before and at the operating temperature this action is helped, and the contacts 21 and 22 moreover slightly burnished one by the other, by a minute frictional slipping of the surface of contact 22 along that of contact 21 resulting from the facts that the points or lines of pivoting of their respective arms 18 and 17 are removed in opposite directions and by limited distances only from the point of tangency of the contacts and are disposed along a line which is oblique to the plane tangent to the contacts.

The operating temperature of the thermostat of FIGURE 1 may be finely adjusted over an appreciable range by turning of the screw 19, an inward movement of which will lower it and an outward movement of which will raise it. This fine adjustment, which is of course effected after the final assembly of the thermostat, may be made permanent and the space within the frame 1 hermetically sealed off by a coating 20, over the screw head, of solder or of a compound such as an epoxy cement.

The mean of the range over which the fine adjustment by screw 19 affected may be approximately established at a desired value, before final assembly of the thermostat, by regulation of the height of the point or line of pivoting of the lever 60, relative to the plane of the bimetallic element 41. This regulation may be accomplished by suitable bending of the forked member 43 just to the left of the element prongs 42a and 42b (if desired, together with a corrective bending of the lug 44 to maintain its normal angularity to the end portion of the element 41).

The output circuit of the thermostat—i.e., the contacts 21 and 22, their arms 17 and 18 and the pins 9 and 10—may be called upon to carry heavy current. It is wholly located in the closest practicable relationship to the header 6 minimizing its resistance and thus its heating by that current and in turn the liberation of such heat as it does develop into the interior of the thermostat. Further the lever 60, located between that circuit and the bimetallic elements, acts as a shield to weaken radiant transfer of heat from that circuit to those elements; still further when the thermostat is used in its upright position as shown in FIGURE 1, the output circuit is located at the top of the interior, minimizing convection transfer from that circuit to those elements. Thus thermal couplings of the output circuit to the bimetallic elements, which might dilute the effect of the close couplings of those elements to the frame, are minimized.

FIGURE 1 has illustrated specifically a thermostat arranged to have its output contacts closed at temperatures below an operating temperature and open at temperatures thereabove. The same basic construction may of course be employed for a thermostat whose output contacts will be open at temperatures below and closed at temperatures above the operating temperature, and the fractional FIGURE 6 illustrates such an employment of that construction. Herein the bimetallic elements (now designated as 41' and 51') are arranged so that the directions in which the lever-affecting portions of their members 40' and 50' are displaced are still opposite to each other, but so that with temperature rise that portion of the first member 40' is displaced upwardly and that portion of the second member 50' downwardly, the low-expansion layers of the bimetallic elements accordingly being the top layer of the upper element 41' and the bottom layer of the lower element 51'. The operation of the thermostat will be readily apparent by analogy to that of the thermostat of FIGURE 1, note being made that in the fine adjustment of the operating temperature an inward movement of the screw 19 will now raise that temperature and an outward movement of that screw will lower it. It is also to be noted that in this case it will be during the sub-operating-temperature condition that there will be no gap above the post 52 and that the rocking of the lever 60 will be at the high rate discussed above. Generically to the two cases, that high-rate lever rocking occurs—as it needs only to do—in that temperature range wherein actual motion of the contacts relative to each other is being effected.

According to a particular aspect of the invention, the thermostat may be arranged so as to be essentially insensitive to slow changes of temperature of its frame but readily responsive to a rapid change regardless of the absolute level at which that rapid change occurs. This is accomplished by arranging the bimetallic elements so that the lever-affecting portions of the members are displaced in the same direction in response to temperature change, and reducing the thermal coupling of one of the bimetallic elements to the frame to a value very much less than that of the other. Such an arrangement has been fractionally shown in FIGURE 7, by way of example for a thermostat whose contacts are to open under the influence of rapid temperature rise. Herein the second bimetallic element 51 (deflecting upwardly with temperature rise) and its securing in the stack 30 may be the same as in FIGURE 1; the first bimetallic element (now designated as 141), however, is arranged so as also to deflect upwardly with temperature rise and is thermally insulated from the frame. Such insulation may be accomplished by shortening the clamped end portion of the element 141 sufficiently so that it is dependably spaced from the wall 5, and by surrounding that portion in the stack with insulation such as the thin mica washers or spacers 35 therebelow and thereabove and a bushing 36 of insulating material around the rivet 33 (the rivet-passing aperture in the element 141 being suitably enlarged to accommodate the bushing).

The effect of the reduced thermal coupling of the first bimetallic element 141 to the frame will be negligible in the case of slow changes of ambient temperature; its member 140 will move substantially in unison with the second member 50 and, in the illustrated case of an open-on-rise thermostat, the gap between the top of post 52 and the lever 60 will be negligibly altered by that rise and the contacts will remain closed. When the frame temperature rises rapidly, however, the delay introduced by the reduced thermal coupling of the first element to the frame will cause the movement of its member 140 to lag very substantially behind the movement of the member 50, and the gap just mentioned will be relatively rapidly closed and the lever then rocked at a relatively high rate to open the contacts. Of course, if the raised frame temperature is maintained the member 140 will ultimately move sufficiently to re-close the contacts; their opening for an interval, however, can of course be utilized for beneficial purposes. There is of course intended no limitation to the case of an open-on-rise thermostat, since it will be readily appreciated that by reversing the directions of deflection of the bimetallic elements and by making the second element (rather than the first) the one thermally insulated from the frame the arrangement of FIGURE 7 can be made applicable to the close-on-rise case.

It will be understood that the motion of the lever in the case of the FIGURE 7 thermostat is responsive to the difference, rather than to the sum, of the movements of the lever-affecting portions of the two members—that difference being almost equal to the movement of that portion of the member 50 in the case of a rapid rise of ambient temperature, but very small in the case of a slow rise.

The essential insensitivity of the thermostat fractionally illustrated in FIGURE 7 to slow changes of temperature of its frame is predicated on a relatively close similarity of the curvatures of the two bimetallic elements per degree temperature change of those elements, such as would result from the use of elements similar (other than in plan configuration as discussed above) to each other. If those curvatures per degree be made substantially different, typically if that curvature in the case of the insulated or less-closely-coupled bimetallic element be made substantially lower than that of the other, there results a thermostat in which the contacts will be operated (opened or closed, as the case may be) at one frame temperature when the frame temperature changes gradually and at a different frame temperature, typically a lower one, when the frame temperature changes rapidly. Such a thermostat is useful as a fire detector as well as in other particular applications.

Such a thermostat is illustrated in FIGURE 8, which will be seen to be similar to FIGURE 7 excepting for the first bimetallic element which, now designated as 141', has been made to have a substantially lower curvature per degree temperature change than has the second element 50. While the reduction of that curvature per degree may be achieved in various manners, among them change of the combination of materials in that element, it has for the sake of illustration been shown as effected by a substantial thickening of that element.

In FIGURE 9 I show a feature which may if desired be used in connection with the thermostat of any of the preceding figures. Its immediate purpose is the avoidance of the high forces which are ordinarily developed in the clamped portions of the bimetallic elements, which portions of course attempt to curve in the same manner as do the unclamped portions; its ultimate purpose is the minimization of tendencies to a drift of the operating temperature of the thermostat, which tendencies I have found to be in large measure due to such attempted curvature and especially so in the case of relatively short and (at their bases) wide bimetallic elements. It consists in the use for the clamped portion of each bimetallic element of a single layer of metal intimately bonded to, and of thickness equal to the aggregate thicknesses of, the two layers which continue to form the unclamped portions, this thick clamped single layer being preferably of metal having the same coefficient of expansion (and permissibly of the same metal) as that of the parts of the stack 30 in which it is clamped; the metal of the high-expansion layer of the bimetallic element frequently meets or approximately meets this specification, in which event the thick clamped single layer may be of identical metal.

Thus FIGURE 9 shows the upper and lower bimetallic elements 241 and 251, respectively having the monometallic clamped portions 241a and 251a meeting or substantially meeting the specification just set forth, the vertical planes of juncture or bonding of those portions to the remaining portions of those elements being accurately aligned with the left-hand edges of 31, 32 and 4a. The drift mentioned above, the tendency to which is minimized by the feature described in this paragraph, occurs particularly as a result of repeated exposure alternately to temperatures substantially above and below the operating temperature. The feature disclosed in this paragraph is not claimed herein, but has been claimed in my copending application Serial No. 171,240, filed February 5, 1962, on which Patent No. 3,117,449 has since been issued.

While I have disclosed my invention in terms of particular embodiments thereof, I intend thereby no unnecessary limitations. Modifications in many respects will be suggested by my disclosure to those skilled in the art, and such modifications will not necessarily constitute departures from the spirit of the invention or from its scope, which I undertake to define in the following claims.

I claim:

1. A thermostat responsive substantially only to a variable environmental temperature including in combination a frame, two cantilever members each comprising a respective bimetallic element, having respective end portions rigidly secured to the frame and extending therefrom in generally face-to-face relationship, said members having respective portions, remote from their respective secured end portions, moved along generally parallel paths normal to the respective member faces by the respective bimetallic elements in response to temperature change, the line between said remote portions forming a substantial angle with each of said paths, means for thermally exposing each of said elements substantially only to said environment temperature, a lever, having a first end pivoted to said remote portion of a first of said members and having a region intermediate its ends pivotally connected with said remote portion of the second member, extending along one of said members, and a pair of contacts moved relatively to each other by the second end of the lever.

2. The subject matter claimed in claim 1 wherein said frame is thermally conductive and is comprised in said exposing means.

3. The subject matter claimed in claim 1 wherein said exposing means comprises thermal coupling means providing close thermal coupling of both of said elements to said environment temperature.

4. The subject matter claimed in claim 1 wherein at least one of said bimetallic elements has throughout at least a substantial part of its length an effective transverse dimension, normal to said path of movement of said remote portion of the member in which it is comprised, which progressively reduces with increasing distance from the secured end portion of that member.

5. The subject matter claimed in claim 1 wherein the bimetallic element comprised in said first member is forked and wherein said remote portion of that member is associated with the prongs of the fork.

6. The subject matter claimed in claim 5 wherein said second member includes projecting means which passes between the prongs of said fork and in which said remote portion of said second member is located.

7. The subject matter claimed in claim 1 wherein said secured end portions of said members are in proximity to each other, wherein said members and the part of said lever between said end and said region thereof extend generally parallel with each other, with the first member intervening between the second member and the lever and wherein said second member includes means which project toward the lever and in which said remote portion of the second member is located.

8. The subject matter claimed in claim 1 wherein the directions in which said remote portions of said members are moved in response to a given temperature change are opposite, whereby to render the distance of relative contact movement responsive substantially to the sum of the distances, and the energy of relative contact movement responsive substantially to the sum of the energies of the movements of said remote portions.

9. The subject matter claimed in claim 1 wherein said exposing means comprises thermal coupling means providing substantially less close thermal coupling of one of said elements to said environmental temperature than of the other.

10. The subject matter claimed in claim 9 wherein the directions in which said remote portions of said members are moved in response to a given temperature change are similar.

11. The subject matter claimed in claim 9 wherein the curvature of the bimetallic element comprised in one of said members per degree temperature change of the bimetallic element is substantially less than that of the bimetallic element comprised in the other member.

12. The subject matter claimed in claim 11 wherein the directions in which said remote portions of said members are moved in response to a given temperature change are similar.

13. A thermostat including in combination a frame, two cantilever members each comprising a respective bimetallic element having an end portion rigidly secured to the frame, said members having respective portions, remote from their respective secured end portions, moved in opposite directions along generally parallel paths by the respective bimetallic elements in response to temperature change, the line between said remote portions forming a substantial angle with each of said paths, a lever having a first end pivoted to said remote portion of a first of said members and having a region intermediate its ends pivotally supported on said remote portion of the second member, and a pair of contacts moved relatively to each other by the second end of the lever through a distance responsive substantially to the sum of the distances, and with an energy responsive substantially to the sum of the energies, of the movements of said remote member portions.

References Cited by the Examiner

UNITED STATES PATENTS

| | | | |
|---|---|---|---|
| 2,392,498 | 1/46 | Osterheld | 200—122 |
| 2,740,019 | 3/56 | Kueser | 200—138 |
| 2,794,884 | 6/57 | Shaw et al. | 200—138 |
| 2,908,786 | 10/59 | Schleicher | 200—116 |

BERNARD A. GILHEANY, *Primary Examiner.*

ROBERT K. SCHAEFER, *Examiner.*